United States Patent [19]

Hollingsworth

[11] 3,845,328

[45] Oct. 29, 1974

[54] TRI-STATE LOGIC CIRCUIT

[75] Inventor: Richard James Hollingsworth, Hopewell, N.J.

[73] Assignee: RCA Corporation, New York, N.Y.

[22] Filed: Feb. 12, 1973

[21] Appl. No.: 332,023

[30] Foreign Application Priority Data

Oct. 9, 1972 Great Britain .................... 46478/72

[52] U.S. Cl. .................. 307/251, 307/205, 307/214, 307/255, 307/279, 307/304

[51] Int. Cl. ........................................... H03k 17/00

[58] Field of Search ........... 307/205, 214, 251, 255, 307/279, 304

[56] References Cited

UNITED STATES PATENTS

| | | | |
|---|---|---|---|
| 3,260,863 | 7/1966 | Burns et al. | 307/205 |
| 3,564,298 | 2/1971 | Colino | 307/255 |
| 3,631,528 | 12/1971 | Green | 307/251 |

*Primary Examiner*—Stanley D. Miller, Jr.

*Attorney, Agent, or Firm*—H. Christoffersen; S. Cohen

[57] ABSTRACT

A first pair of complementary transistors have their conduction paths serially connected between supply and ground with the midpoint of the series connected to an output terminal. A control circuit comprising two pair of complementary transistors coupled to the control electrodes of the first pair of complementary transistors applies complementary signals thereto in response to a control signal manifestation of one value for maintaining both transistors of the first pair off, and applies identical signals thereto in response to a control signal manifestation of a second value for turning one transistor of the first pair on.

4 Claims, 3 Drawing Figures

TRI-STATE LOGIC CIRCUIT

STATEMENT

The invention described herein was made in the performance of work under a NASA Contract and is subject to the provisions of Section 305 of the National Aeronautics and Space Act of 1958, Public Law 85-568 (72 STAT. 435; 42 U.S.C. 2457).

This invention relates to logic circuits and particularly to tri-state logic circuits employing complementary transistors.

A tri-state logic circuit of the type of interest here is one having an output terminal that can assume one of three states. It can provide current to a load in a first state, it can receive current from a load in a second state or it can assume an isolated (floating) condition in a third state. Such circuits are useful, for example, in digital applications where it is desired to connect the outputs of a number of logic circuits to a common data buss. One such use is in memory systems where the information stored in a number of storage cells is sequentially gated to a common data buss to obtain serial read-out of stored data. In MOS technology, such gating can be achieved by connecting the output of a logic gate to a data buss through a transmission gate and strobing the transmission gate to read data onto the data buss. When the transmission gate is turned off (its third state or "floating" condition), it offers a high degree of isolation between the driving logic circuit and the data buss. When turned on, the transmission gate is in either its first or second state. In the former, it applies current to the buss and in the latter, the driving circuit removes current from it. Both states are possible because of the bi-lateral nature of the transmission gate's conduction path.

Where only moderate data rates are involved, transmission gates provide a simple and effective means of obtaining tri-state operation. In higher speed applications, however, the series resistance of the conduction path of the transmission gate in combination with its relatively high shunt capacity become significant factors in the rate at which data can be supplied to the data buss because of the low-pass filter formed by the series resistance and shunt capacitance of the "on" transmission gate and the sum of the shunt capacities of all the transmission gates connected to the data buss.

An alternative approach for obtaining tri-state operation, is to directly drive the data buss with a pair of complementary transistors connected between supply and ground and provide a logic circuit for separately controlling the gates of the complementary transistor pair. When the logic circuit applies identical signals to the gates, one or the other of the transistors will turn on clamping the data buss to supply or to ground depending upon the sense of the control signal. When the logic circuit supplies suitable complementary signals to the complementary transistors, both will be biased off concurrently to isolate the data buss. This alternate approach offers low impedance symmetrical drive with low shunt capacity to the data buss and is capable of inherently higher speed operation then conventional transmission gate tri-state circuits. This latter approach is not without cost, however, the cost involved being of greater circuit complexity.

The conventional approach to implement this latter circuit utilizes a combination of NOR gates, NAND gates, and a pair of complementary output transistors requiring five times as many transistors as the transmission gate approach. Since silicon area is at a premium in the manufacture of semiconductor circuits, and particularly so in the manufacture of large scale integrated circuits, it would be desirable to implement the directly driven tri-state circuit with as few transistors as possible. It would be particularly desirable to replace one or both of the NOR and NAND gates concurrently used with simpler structures to conserve silicon area and increase reliability by having a lower component count.

In the invention herein disclosed, first and second complementary transistors have their conduction paths serially connected between supply and ground with the midpoint of the series connected to an output terminal. A control circuit, comprising two pair of complementary transistors, applies complementary signals to the first and second transistors to bias both off concurrently in response to a first control signal manifestation, and applies identical signals to the first and second complementary transistors to cause a turn on voltage to be applied to one of said first and second transistors in response to a second control signal manifestation.

In the examples of the invention illustrated in the figures, all the odd-numbered transistors are N-channel enhancement mode MOS–FET devices, all the even-numbered transistors are P-channel enhancement-mode MOS–FET devices, and terminals 11 and 12 are maintained at positive supply potential and ground respectively. It is to be understood, of course, that different conductivity type transistors and different supply potentials could be used instead. The logic convention adopted here is that a positive voltage corresponds to binary 1 and a ground level voltage corresponds to binary 0.

Figure 1:
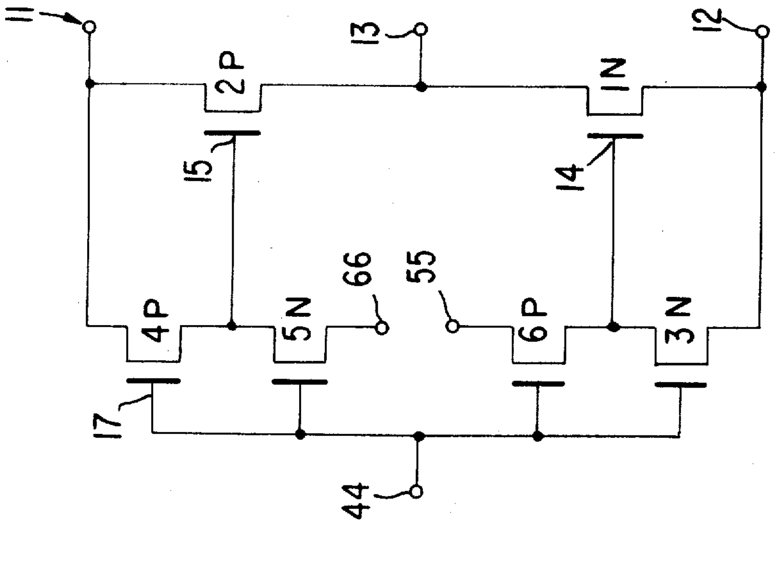
FIG. 1 is a schematic diagram of a first embodiment of the invention.

In the embodiment of the invention shown in FIG. 1, the conduction path of a first transistor is connected between an output terminal 13 and ground 12. A positive voltage applied to gate 14 of first transistor 1 will turn it on thus clamping output terminal 13 to ground. Conversely, if the voltage supplied to transistor 1 is of ground level, transistor 1 will present a high impedance between output terminal 13 and ground 12. Transistor 3 and Transistor 6 have one end of their conduction paths connected to gate 14 of transistor 1 and their gates, 17 connected in common with signal input terminal 44. A first control terminal 55 is connected to the other end of the conduction path of transistor 6. The other end of the conduction path of transistor 3 is connected to ground 12.

Under the assumptions and logic convention previously stated, and ignoring the parts of the circuit not yet described, transistor 1 will be controlled by application of signals to signal input terminal 44 and first control terminal 55 as follows:

| Signal Input 44 | First Control 55 | Output Terminal 13 |
|---|---|---|
| 0 | 0 | * |
| 1 | 0 | * |
| 0 | 1 | 0 |
| 1 | 1 | * |

where:
* = open circuit

The only signal values which cause the output terminal 13 to be clamped to ground 12 are a low (binary 0) present at input signal terminal 44 concurrently with a high (binary 1) at the first control terminal 55. In all other cases, transistor 1 is off thus presenting a high impedance (open circuit) between ground 12 and output terminal 13.

Still referring to FIG. 1, transistor 2 has its conduction path connected between output terminal 13 and supply 11. A ground level voltage (binary 0) applied to gate 15 of transistor 2 will turn it on thus clamping output terminal 13 to supply 11. Conversely if the voltage applied to transistor 2 is of supply level, transistor 2 will present a high impedance between supply 11 and output terminal 13. Transistor 4 and transistor 5 have one end of their conduction paths connected to gate 15 of transistor 2 and their gates, 17, connected in common with signal input terminal 44. A second control terminal 66 is connected to the other end of the conduction path of transistor 5. The other end of the conduction path of transistor 4 is connected to supply 11.

Under the assumptions and logic conventions previously stated, and ignoring transistors 1, 3 and 6, transistor 2 will be controlled by application of signals to signal input terminal 44 and the second control terminal 66 as follows:

| Signal Input 44 | Second Control 66 | Output Terminal 13 |
|---|---|---|
| 0 | 1 | * |
| 1 | 1 | * |
| 0 | 0 | * |
| 1 | 0 | 1 |

where:
* = open circuit

Here, the only condition which allows output terminal 13 to be clamped to supply 11 (i.e., binary 1) is when the input signal 44 is high (binary 1) and the control signal 66 is low (binary 0). In all other cases, transistor 2 is off, thus presenting a high impedance (open circuit) between supply 11 and output terminal 13.

If, in the first embodiment of the invention, represented by FIG. 1, the signal presented to terminal 66 is the complement of the signal presented to terminal 55 and if letter A represents the binary state of an input signal applied to terminal 44, the truth tables previously presented combine and simplify to:

| Signal Input 44 | First Control 55 | Second Control 66 | Output Terminal 13 |
|---|---|---|---|
| A | 0 | 1 | * |
| A | 1 | 0 | A |

where:
* = open circuit

Thus, from the combined truth table of the circuit of FIG. 1, it is seen that the circuit has a first operating mode in which the output terminal "floats" (operates as an open circuit) and a second operating mode in which non-inverted buffered signals appear at the output. Such a circuit is useful in applications where it is desired to buffer an input digital signal line to an output signal line in a first mode and isolate the input line from the output line in a second mode. For example, the circuit may be used as a sense amplifier for an information storage array with its signal input terminal connected to one or more cells of the array and its output wire-OR'ed with the outputs of other like circuits associated with other memory arrays. The wire-OR capability is possible because the output terminal is isolated from both supply and ground for all periods except those within which it is desired to sense the input signal. This function, implemented in convention complementary MOS NOR/NAND gating driving complementary output transistors would require ten transistors and would occupy, as a first approximation, over sixty percent more area in an integrated circuit, than the embodiment disclosed in FIG. 1.

Figure 3:
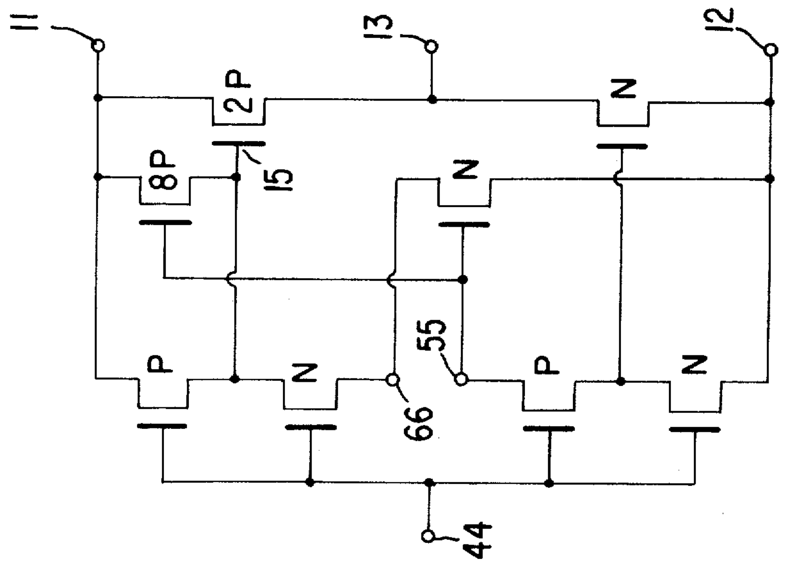
FIG. 3 is a schematic diagram of a third embodiment of the invention.
Figure 2:
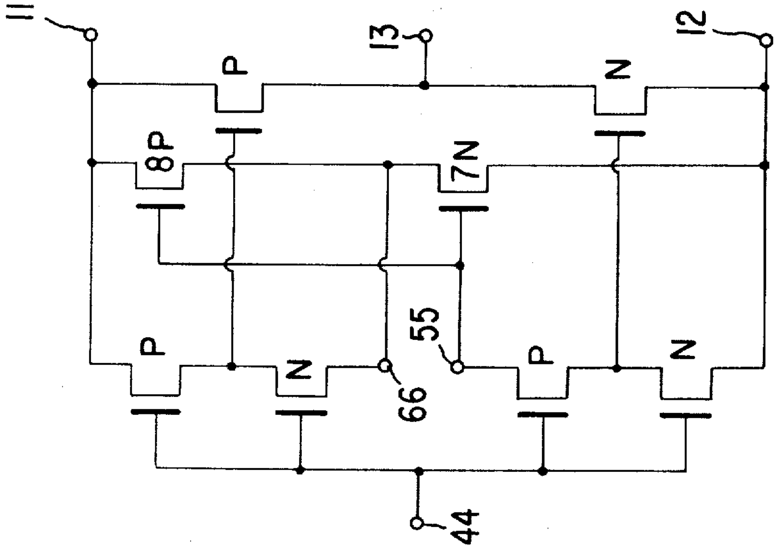
FIG. 2 is a schematic diagram of a second embodiment of the invention.

FIGS. 2 and 3 illustrate two additional embodiments of the instant invention. In these circuits, unlike the circuit of FIG. 1, only a single external control signal is needed to control the two operating modes described above. The cost of this added feature is the inclusion of two additional complementary transistors increasing the number of transistors required to eight. The prior art equivalent however, to operate in a similar manner, also includes an extra transistor pair requiring a total of twelve transistors. To a first approximation, the prior art equivalent occupies fifty percent more silicon area in an integrated circuit.

FIG. 2 is identical to FIG. 1 except for inclusion of two additional transistors 7, 8. Transistor 7 has its conduction path connected between second control terminal 66 and ground 12. Transistor 8 has its conduction path connected between supply 11 and second control terminal 66. The gates of both transistors are connected to first control terminal 55. Thus connected, these transistors invert signals present on first control terminal 55 and apply the inverted signals to second control terminal 66.

FIG. 3 is identical to FIG. 2 except that the conduction path of transistor 8 is connected between supply 11 and gate 15 of transistor 2 instead of between supply 11 and second control terminal 66. The function of transistor 8 in this embodiment is to clamp gate 15 of transistor 2 to supply 11 in order to turn transistor 2 off when the control signal present at terminal 55 is low (binary 0).

The truth table, applicable to the embodiments of both FIG. 2 and FIG. 3 is:

| Signal Input 44 | First Control 55 | Output Terminal 13 |
|---|---|---|
| A | 0 | * |
| A | 1 | A |

where:

* = open circuit

Thus, as in the circuit of FIG. 1, there are two operating modes for the circuits of FIG. 2 and FIG. 3. They are: (1) a first mode in which output terminal 3 is essentially open circuited from supply 11 and ground 12; and (2) a second mode in which non-inverted buffered signals representative of the signal applied to signal input terminal 44 appears at output terminal 13. The circuit can be used in applications where it is desired to buffer an input digital signal line to an output buss in a first mode and isolate the input line from the output buss in a second mode. For example, the circuit may be used as a sense amplifier for an information storage array with its input connected to one or more cells in the array and its output wire-OR'ed with the outputs of other like circuits associated with other memory arrays.

It will be recognized by those skilled in the art that each of the circuits illustrated has a dual obtained by reversing the transistor types and power supply potentials. For instance, the circuit of FIG. 3 may be implemented with P - type devices for the odd - numbered transistors and N - type devices for the even - numbered transistors with terminal 12 maintained relatively positive with respect to terminal 11. Further, the specific choice of complementary MOS transistors in the examples given is not meant to be limitive of the invention disclosed. For example, the present invention may be realized by the use of other suitable transistor types such as complementary bi-polar transistors or mixed bi-polar and MOS devices or complementary enhancement-mode and depletion-mode transistors and the like. Finally, the choice of logic convention used here is purely arbitrary.

What is claimed is:

1. In combination:

first and second circuit points across which an operating potential may be applied;

first and second control terminals for receiving complementary binary valued control signals;

a circuit output terminal;

three pair of complementary transistors, each transistor having a conduction path and a control electrode, the conduction paths of the first pair being connected in series between said first and second circuit points and the midpoint of the series connected paths connected to said circuit output terminal, the conduction paths of the second pair being connected in series between said first circuit point and said first control terminal with the midpoint of the series connected paths connected to the control electrode of one transistor of the first pair, the conduction paths of the third pair being connected in series between said second circuit point and said second control terminal with the midpoint of the series connected paths connected to the control electrode of the other transistor of said first pair; and a circuit input terminal connected to the control electrode of each transistor of the second and third pair of transistors.

2. The combination recited in claim 1 further including:

a fourth pair of complementary transistors, each transistor having a control electrode coupled to said first control terminal, one transistor having its conduction path coupled between said second control terminal and said first circuit point, the other transistor having one end of its conduction path coupled to said second circuit point; and means for applying a potential to the other end of the conduction path of said other transistor.

3. The circuit recited in claim 2 wherein said means for applying a potential to said other end of the conduction path of said other transistor comprises means coupling said other end to said second control terminal.

4. The circuit recited in claim 2 wherein said means for applying a potential to said other end of the conduction path of said other transistor, comprises means coupling said other end to said midpoint of the series connected conduction paths of said third pair of complementary transistors.

* * * * *